United States Patent
Jagunich

Patent Number: 6,024,907
Date of Patent: Feb. 15, 2000

[54] EMBOSSING WITH AN ENDLESS BELT COMPOSED OF A SHAPE MEMORY ALLOY

[75] Inventor: Bruce Frank Jagunich, F. H., Ariz.

[73] Assignee: Bruce Jagunich, Fountain Hills, Ariz.

[21] Appl. No.: 09/016,969

[22] Filed: Feb. 2, 1998

[51] Int. Cl.⁷ ................................................. B29C 59/04
[52] U.S. Cl. ...................... 264/284; 264/210.2; 264/293; 425/373; 425/385
[58] Field of Search .................. 264/284, 293, 264/210.2; 425/373, 371, 394, 385, 327

[56] References Cited

U.S. PATENT DOCUMENTS

| | | |
|---|---|---|
| 2,849,752 | 9/1958 | Leary . |
| 3,174,851 | 3/1965 | Buehler et al. . |
| 3,478,141 | 11/1969 | Dempsey et al. . |
| 3,700,434 | 10/1972 | Abkowitz et al. . |
| 3,966,383 | 6/1976 | Bussey, Jr. et al. ...................... 425/388 |
| 4,055,955 | 11/1977 | Johnson ..................................... 60/527 |
| 4,211,743 | 7/1980 | Nauta et al. ............................. 264/284 |
| 4,269,585 | 5/1981 | Gersbeck et al. ........................ 425/373 |
| 4,615,853 | 10/1986 | Aoyama et al. ......................... 264/122 |
| 4,740,258 | 4/1988 | Breitscheidel .......................... 156/209 |
| 4,787,837 | 11/1988 | Bell .......................................... 425/385 |
| 4,859,392 | 8/1989 | Vetter ....................................... 264/166 |
| 5,108,814 | 4/1992 | Harp et al. ............................... 428/156 |
| 5,149,481 | 9/1992 | Gross et al. ........................... 264/210.2 |
| 5,204,037 | 4/1993 | Fujii ......................................... 264/171 |
| 5,211,899 | 5/1993 | Fujii ......................................... 264/180 |
| 5,233,921 | 8/1993 | John ......................................... 101/349 |
| 5,286,436 | 2/1994 | Funk et al. ............................ 264/210.2 |

FOREIGN PATENT DOCUMENTS 1-235606   9/1989   Japan .

*Primary Examiner*—Jan H. Silbaugh
*Assistant Examiner*—Mark Eashoo

[57] ABSTRACT

An endless belt composed of a shape memory alloy is used for surface finishing thermoplastic film or sheet as it leaves the die of an extruder, or finishing roll of a calender or some means to heat the surface of the film or sheet to the required softening temperature. Since shape memory alloys have the unique property of increasing in volume as they get colder, instead of decreasing in volume, the tendency of the film or sheet to stick to the endless belt is decreased. This allows for the continuous production of surface finished film or sheet.

8 Claims, 1 Drawing Sheet

EMBOSSING WITH AN ENDLESS BELT COMPOSED OF A SHAPE MEMORY ALLOY

THE BACKGROUND OF THE INVENTION

This invention relates to a process for the surface finishing of thermoplastic film or sheet when it is in the molten or softened state. This state could be attained by the use of an extruder, calender stack or some means of heating the film or sheet to its softening temperature. The method of this invention involves the pressing of a shape memory alloy endless belt into a thermoplastic film or sheet which has been heated above its softening temperature and then cooling the film or sheet and the belt through the belt's temperature transition range. The face of the shape memory alloy belt would have a desired finish on its face making contact with the film or sheet face.

In the production of thermoplastic film and sheet it is frequently desirable to use at least one roll with a relatively resilient surface in order to compensate for variations in the thickness of the film or sheet passing through the nip of two cooperating rolls, and to maintain a relatively uniform pressure across the width of the film or sheet. In many instances an endless belt, composed of metal or a resilient material, has been used in combination with the above mentioned rolls to transfer to the face of the film or sheet certain desirable characteristics. A few of these characteristics would be any one or combination of the following. The film or sheet could have a tendency to stick to the above mentioned cooperating rolls. The film or sheet could be mirror finished for clarity on one, or both, of its surfaces. The film or sheet could be embossed with a surface finish to hide imperfections. Or, the film or sheet could be embossed with a matte finish such that any of the following could be performed. The surface would be better suited for an adhesive coating or better suited for inking.

It is an object of the present invention to show that the use of an endless belt composed of a shape memory alloy is particularly useful in attaining the above. It is another object of this invention to show that if this belt has a coating of a resilient material such as silicone rubber applied to its embossing face, that this combination is also useful in attaining the above characteristics.

DISCUSSION OF THE BACKGROUND

The fact that the use of an endless belt can aid in attaining the desired characteristics previously mentioned is obvious by the many patents relating to the use of endless belts. When durability and long life are required in a matte finishing process the difference is substantial when a comparison is made to an endless belt composed of a resilient matter, such as silicone rubber, and a metal surface. The pattern on the rubber slowly wears away where as a metallic surface has much greater durability. Of all the many patents using an endless metal belt, no patent teaches the use of an endless belt composed of a shape memory alloy.

Of the many patents relating to the surface finishing of thermoplastic film and sheet the following provide some of the prior art.

U.S. Pat. No. 4,740,258 teaches embossing of lengths of foam material using a perforated metallic embossing belt. This belt is impressed into the foam sheet and automatically vents dammed-up or trapped air. A stainless steel belt is emphasized and no provision is made for a shock absorbing device if a shape memory alloy belt composed of wires were used.

U.S. Pat. No. 4,787,837 teaches embossing and matte finishing by the use of metallic surfaces. It also provides detailed information concerning a matte surface finish and the prior art available in other patents.

Japanese Pat. 89-235606 does teach the use of a shape memory alloy when used in a cast molding die. This patent illustrates the excellent surface transfer characteristics of shape memory alloys. This molding method is basically a static process with no relationship to a dynamic process such as a moving endless metal belt.

U.S. Pat. No. 5,204,037 teaches polypropylene film surface finishing using a metal endless belt. The belt must have a finish of not more than 1.5 um under tension and does not account for the following. The use of a shape memory alloy belt for the surface finishing of film or sheet must be closely controlled. If too much cooling occurs while the belt and film or sheet are in contact with any cooling roll, the shape memory alloy belt could pass through its temperature transition range. This would result in eventual shape memory lose in the belt and probably belt failure from stress.

U.S. Pat. No. 5,233,921 does teach the use of shape memory alloys when relating to a printing system. A brief description in regards to what shape memory alloys are available is brought forth which includes the nickel-titanium alloys. The present invention found that a nickel-titanium alloy was particularly useful when in the form of an endless belt.

It should also be noted that in most of the patents where an endless metal belt is used, its finishing face must have a mirror like or superfinished surface. In the present invention the shape memory alloy endless belt can have a matte finish.

BRIEF DESCRIPTION OF THE DRAWING

The drawings are a schematic cross section of an embossing and surface finishing apparatus for carrying out the invention.

DETAILED DESCRIPTION OF THE INVENTION

The method of this invention involves the pressing of a shape memory alloy endless belt surface into a thermoplastic film or sheet surface, which has been heated above its softening temperature, and then cooling the film or sheet and belt until their temperature drops below the temperature transition range of the shape memory alloy endless belt. The basic principles of the present invention are best illustrated by referring to the schematic drawing.

Figure 1A:
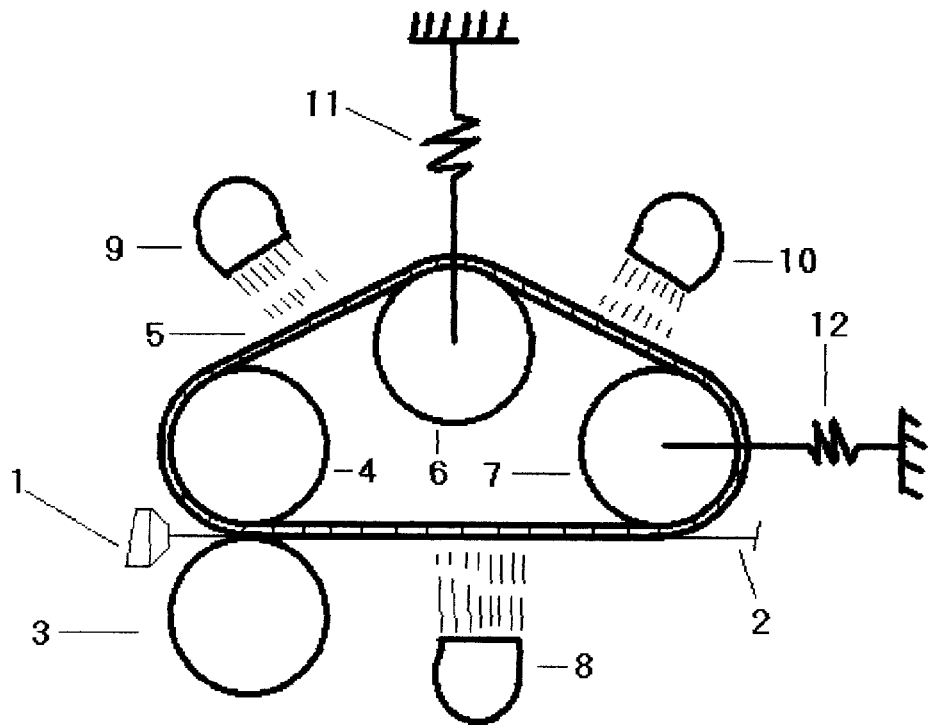
FIG. 1a shows a schematic cross section view of the overall general surface finishing process.

Referring to FIG. 1a, the endless metal belt (5) is composed totally or partly of a shape memory alloy. Although new shape memory alloys are continually being formulated the alloy used in this method was a nickel-titanium base alloy. It was chosen for its mechanical strength and its resistance to corrosion. The thickness of the belt was approximately 0.050 inches, however, thinner or thicker belts could be used. The endless belt (5) had a temperature transition range of approximately 110° F.–140° F. which is defined as follows. The words "temperature transition range" will from here forth refer to the metallurgical structural change of the shape memory alloy going from austenite to martensite which would represent a volume increase, or from martensite to austenite which would represent a volume decrease.

In regards to shape memory alloys based on nickel-titanium many temperature transition ranges are possible. Depending on the increasing or decreasing of nickel content, temperature transition ranges vary from approximately −60° F. To 300° F. The temperature transition range of 110° F.–140° F. was chosen because the softening temperature of, for example, polypropylene is approximately 284° F.–302° F. and the final product temperature is more in line with physical working conditions. By comparing the temperature ranges it is obvious that the softened state for the thermoplastic disappears before the belt goes through its temperature transition range. If a different type of thermoplastic film or sheet were used where its softening temperature fell within the temperature transition range, then the shape memory alloy endless belt's nickel content would have to be adjusted according.

Referring to FIG. 1a, the thermoplastic film or sheet (2) represents the film or sheet to be surface finished. The extruder die, or a calender finishing roll or some source which heats the film or sheet (2) to a softened state such that it can be surface finished is represented by (1).

As the film or sheet (2) and the endless belt (5) come in contact with each other in the nip of the two cooperating driven rolls, (4) and (3), a pressure is applied to the nip such that the finish on the face of the endless belt (5) is transferred to the face of the film or sheet (2). Leaving this nip the film or sheet (2) and the endless belt (5) are cooled by some means represented by (8). This cooling could be chilled air blowing evenly across the face of the endless belt (5) and the film or sheet (2) or even running the belt through chilled water. However this cooling occurs it must be sufficient to cool the endless belt (5) through its temperature transition range which leads to a volume increase. This allows for easy release of the film or sheet (2) from the endless belt (5). The endless belt (5) is now evenly heated by some means represented by (9) and (10). This heating could be accomplished by such a means as low temperature steam, infrared heaters or hot air blowing evenly across the belt face. What is important is that the heating must be sufficient to pass the endless belt (5) through the temperature transition range so that a volume decrease occurs in the endless belt. The endless belt (5) is now ready to repeat the cycle of surface finishing more of the film or sheet (2).

Tension devices (11) and (12) represent a device for keeping the proper tension on rolls (6) and (7) so that the endless belt (5) can be driven. The tension devices (11) and (12) also represent some means of shock absorbing device to keep stress buildup in the endless belt to a minimum. This device could consist of springs, shock absorbers or some elastic or resilient material. Such a device is required since the stresses induced in the belt during cooling can be substantial. Since most of the volume change occurs at the beginning of the cycle the stresses can be so great as to permanently introduce irreversible shape change in the belt. Although the purpose of roll (6) could be accomplished by roll (7), roll (6) did help keep the radius of curvature of the endless belt to a minimum so that smaller rolls could be used. Also, the purpose of tension and shock absorbing device (11) could be accomplished by tension and shock absorbing device (12) only if roll (6) was eliminated.

When the endless belt consists of shape memory alloy only with no resilient material on its face, or (see FIG. 1c), if it has resilient material (13) on its surface finishing face only, it is important that the following should try to be avoided. When the endless belt passes through the temperature transition range it should not be in contact with rolls (6),(7),(4) or (3) since the stresses involved could have a permanent deforming effect on the endless belt. This deforming effect could lead to belt cracking and shape memory effect loss. It is also important to note that if the endless belt (5) is unevenly heated it will have a tendency to adopt a curved shape which can lead to belt cracking and failure.

Figure 1B:
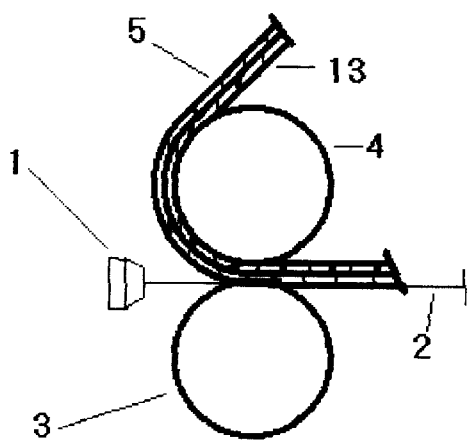
FIG. 1b shows a schematic cross section view of the process wherein a resilient material is on the non finishing surface of the endless belt.
Figure 1C:
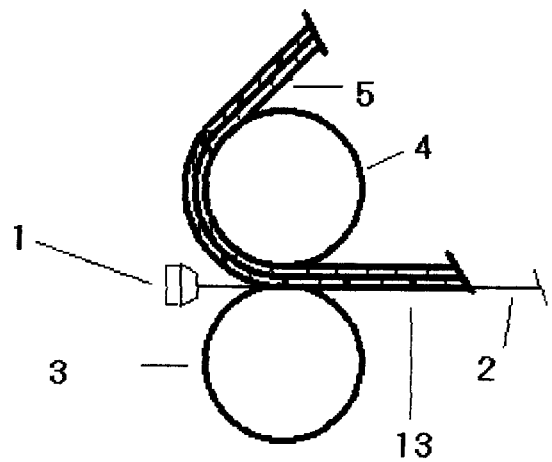
FIG. 1c shows a schematic cross section view of the process wherein a resilient material is on the finishing surface of the endless belt.

Referring to FIG. 1c, It has further been found that if the endless belt (5) has a thin coating of a resilient material, such as silicone rubber, applied to the face coming in contact with the film or sheet (2), the embossing pattern in the silicone rubber not only easily separates from the film or sheet, but the rubber helps keep the endless belt from curving. As the endless belt experiences temperature transition range change toward a volume increase the silicone rubber experiences a temporary stretching. The thickness of the silicone rubber was approximately one sixteenth inch but thinner or greater thickness could work as well. However, if the rubber gets to thick the elastic stretching of the rubber may not migrate to the surface finishing face to facilitate this easy releasing.

Referring to FIG. 1b, It has also become apparent that if the face of the endless belt (5), which does not do surface finishing of the film or sheet, has a resilient material (13) applied to its surface the following benefit is observed. The resilient material helps stabilize the belt's tendency to curve and the endless belt can go through the temperature transition change range when it is in contact with another surface such as rolls (6) or (7). The thickness of this resilient material should be such that most, if not all, of the stresses from the shape memory effect are absorbed within it. Although other thicknesses and hardness of rubber will work the following was tried. The alloy belt was laid over ½ inch thick rubber belt with a durometer hardness of approximately 10.

Referring to FIG. 2, with the above in mind the surface finishing of the film or sheet can also be accomplished by replacing roll (3) with the following roll. Given a roll with the proper diameter and proper resilient material on its face, a shape memory alloy film can be fitted firmly over this resilient material face. The endless belt (5) would be eliminated and the film or sheet (2) would be kept in contact with roll (3), by the use of roll (4), until shape memory transition takes place through a cooling means. The film or sheet is now released from roll (3). By using a heating means to allow shape memory transition to occur before more of the film or sheet makes contact with roll (3) in the nip of the cooperating rolls, finishing is continued.

It has also been found that if the shape memory alloy belt is composed of shape memory alloy wires and these wires are molded to a resilient material, the following benefits occur. The resilient material will still under go stretching and shrinking as the shape memory alloy wires shrink and stretch which greatly aids in film or sheet separation from the endless resilient belt. The resilient belt will be less prone to curving over its width since the shape memory alloy belt is no longer composed of a solid continuous belt over its width.

By molding shape alloy wires to the resilient material and putting them at different angles to each other it is also possible to design a belt which separates from the thermoplastic film or sheet in different areas of the belt sooner or later than would normally occur. To site an example for the above application, if a pattern to be embossed into a film or sheet is more complicated or intricate in certain areas the above result is desirable. Certain parts of the embossing pattern may have a tendency to stick more. By controlling the direction of wrappings of the shape memory alloy wires in the resilient belt this sticking problem is reduced.

There is a trade off, however, on how fast the belt can be driven versus the rate of heating and cooling of the belt since the thickness of the rubber makes it take longer to cool or heat the shape memory alloy belt. It is also obvious from this discussion that the rolls involved could have a resilient face, especially roll (6) or roll (7). In the nip, however, other problems surface which include a good embossing transfer not taking place if to much resilient material is present on roll (4).

EXAMPLE

The surface of a polypropylene film was embossed to a matte finish of approximately 32 micro inches. The nip pressure was approximately 30 lbs./in.$^2$. The temperature transition range for the shape memory alloy endless belt was approximately 110° F.–140° F. The film thickness was 3 mil.

The surface of a polyethylene film was also embossed under these same conditions.

Although this discovery revolves around thermoplastic material this process could also be useful for surface finishing such materials as paper, cardboards, composites and even soft metal sheeting when metal to metal contact is used. The previously mentioned problem of sticking may not be as severe as that encountered in surface finishing thermoplastics but it still exists.

In certain instances it may be desirable to have the shape memory alloy belt go through its temperature transition range while the film or sheet (2) is still in a softened state. The objective being to stretch the film or sheet out over its length, width or both directions and before the film or sheet is cooled below its softened state. To accomplish this the nickel content, for a shape memory alloy belt composed of a nickel-titanium alloy, would have to be adjusted according. The temperature transition range of the shape memory alloy belt would have to be adjusted to match the softening temperature of the film or sheet being surface finished.

It is claimed:

1. A method for the surface finishing of a film or sheet in a softened state, comprising the steps of:

a) passing an endless belt comprising a shape memory alloy through a nip of two cooperating rolls, wherein the endless belt is at a temperature above the temperature transition range of the alloy;

b) passing the film or sheet through the nip such that a face of the film or sheet makes contact with a finished face of the belt;

c) applying pressure to the nip such that the face of the belt is pressed into the face of the film or sheet, thereby forming a finish on the film or sheet face;

d) cooling the belt and film or sheet to a temperature below the temperature transition range of the alloy, which increases alloy volume thereby allowing easy release of the film or sheet from the belt;

e) releasing the film or sheet from the belt, wherein the finished film or sheet face mimics the belt face;

f) reheating the belt to a temperature above the temperature transition range of the alloy after the film or sheet is released from the belt, but before the film or sheet makes contact with the belt at the nip, thereby decreasing alloy volume; and g) keeping the belt under tension by a shock absorbing means which dissipates shock induced to the endless belt as the endless belt is heated above and cooled below the temperature transition range of the alloy.

2. The method of claim 1, wherein the finishing face of the endless belt has a mirror faced finish.

3. The method of claim 1, wherein the finishing face of the endless belt has a resilient material applied thereon.

4. The method of claim 1, wherein an endless belt face not surface finishing the film or sheet has a resilient material applied thereon.

5. The method of claim 1, wherein the shock absorbing means is a resilient material attached to one roll not forming the nip.

6. The method of claim 1, wherein the endless belt comprises shape memory alloy wires bonded to a resilient material.

7. The method of claim 1, or claim 6 wherein the endless belt is cooled below the temperature transition range of the alloy while the film or sheet is still in a softened state.

8. The method of claim 1, wherein the finishing face of the endless belt has a matte faced finish.

* * * * *